Feb. 27, 1968 J. R. FEATHERSTON 3,371,225
CLOCKING PULSE RATE DETECTION CIRCUITRY
Filed Dec. 28, 1964
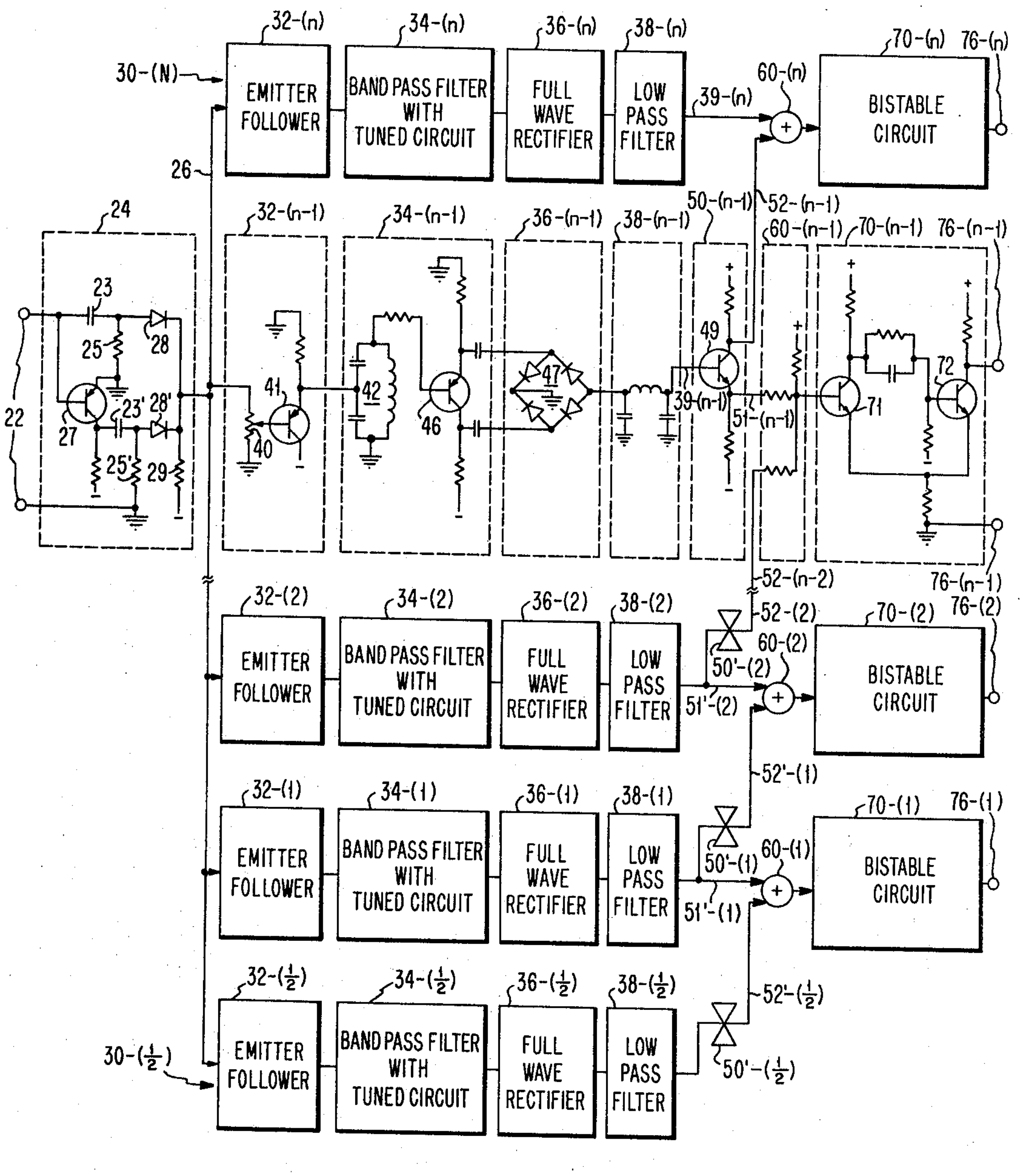
INVENTOR.
JOHN R. FEATHERSTON
BY
ATTORNEY United States Patent Office
3,371,225
Patented Feb. 27, 1968

3,371,225

CLOCKING PULSE RATE DETECTION CIRCUITRY

John Richard Featherston, Tucson, Ariz., assignor to International Business Machines Corporation, Armonk, N.Y., a corporation of New York Filed Dec. 28, 1964, Ser. No. 421,223
4 Claims. (Cl. 307—233)

ABSTRACT OF THE DISCLOSURE

One of a plurality of bistable circuits corresponding to a plurality of predetermined clocking pulse repetition rates is switched in accordance with the detection of a received signal for enabling a clocking pulse generator corresponding to the repetition rate of the signal received.

Detection is performed by a plurality of band pass filters each having a circuit tuned to one of the predetermined repetition rates followed by a signal rectifier and an appropriate low-pass filter. Dual input adder circuits connected to the bistable circuits are arranged to apply the output of the corresponding low-pass filter to the bistable circuit. An inverter connected to the adjacent lower pulse repetition rate or noise low-pass filter is connected to the adder circuit for enhancing the switching voltage input to the bistable circuit.

The arrangement is suitable for systems in which the predetermined repetition rates are not harmonically related as well as those in which they are.

The invention relates to adaptive radiowave-propagated data communication systems in which a primary characteristic, such as the carrier frequency and/or the transmission or clocking pulse rate, is changed in accordance with variations in propagation efficacy, and it particularly pertains to circuitry for the receiving station of detection systems for such communication systems for detecting the current transmitting rate and controlling the regeneration of a clocking pulse train for processing the data signal.

In adaptive radio systems, especially those operating at high radio frequencies, changing conditions of the propagation medium may adversely affect the accuracy and efficacy of communications. Variations such as fading, distortion, and the like, as is well known, are sharply selective as to carrier frequency whether modulated or unmodulated. However seasonal, diurnal, sun spot-cycle behavior and, to some extent, changes in the magnetic field of the earth, and their effect on the ionosphere, may be predicted, and the influence of these on the transmission efficacy of various carrier frequencies and modulating pulse rates may also be predicted. To provide consistent communications, therefore, the carrier frequencies and the data pulse rates by which they are modulated may be selected at the transmitting station in accordance with the schedule contemplating the predictions, or in response to information obtained from the receiving station that the current carrier frequency and/or modulating pulse rate is unsuitable. It, therefore, becomes necessary for the receiving station to respond to the carrier frequency and/or pulse rate selection made at the transmitting station, and it is preferable that this response be made automatically and immediately as any such change is made.

Accordingly, an object of the invention is to provide a receiver which will permit the communication system to operate continuously and positively at different speeds under varying conditions of severe fading, distortion, and interference, with the result that the probability that the release of a message containing an error by the system is exceedingly small.

Another object of the invention is to provide in a receiving station capable of receiving signals of different modulating pulse repetition rates, a detection system which automatically determines the currently transmitted modulating pulse rate and selects the immediate response to the preferred rate to the exclusion of any other.

The foregoing and other objects are accomplished by providing clocking pulse rate detection circuitry automatically recognizing the pulse modulation rates adapting the data processing circuitry at the receiving station to respond at that fundamental pulse repetition rate. This is accomplished by determining certain properties of the received signal. Due to the transmission effects mentioned above the received signal may at times be severely distorted with many received pulse transitions missing or randomly displaced in time from the correct positions.

It should be clearly understood that as used herein the term "fundamental pulse repetition rate" is construed as the timing rate at which pulses are processed in the associated data processing system regardless of the absence of possible pulses resulting from imparting information onto the pulse signal train.

The invention comprises detection circuitry for inclusion in a communications receiver, capable of sensing which of a plurality of different predetermined modulating pulse rates currently are being transmitted and causing the data processing components at the receiving station to respond thereto. The detection circuitry shown in the figure is located between the output of the modulated wave detector of the radiowave receiver and the clocking pulse generating portion of the data processing component for providing a control voltage indicative of the current predetermined clocking pulse rate currently being transmitted. The output voltage of the detection circuitry may be applied to actuate one of a predetermined number of separate pulse generating circuits of predetermined rate, or to alter the pulse rate determining subcircuitry of a single clocking pulse generating circuit as desired; the invention resides in the detection and indication of the currently transmitted modulating pulse rate.

According to the invention, the data signal of a given one of a plurality of predetermined fundamental pulse repetition rates is applied to pulse generating circuitry for producing unidirectional (say positive going) spikes at the transitions of the pulses or the received data. This spike signal is then applied to a plurality of pulse rate detector branch circuits having means for developing voltages at frequencies corresponding to the different predetermined fundamental pulse repetition rates and means for developing corresponding voltages providing an indication of the current fundamental pulse repetition rates currently transmitted and applicable for controlling clocking pulse generating circuitry for the data processing components. Essentially, each of the detector branch circuits are the same except for the inclusion of at least one tuned circuit resonant at the fundamental pulse repetition rate to build up the voltage at that rate according to the frequency components present. The basic circuitry according to the invention is applicable to systems wherein the different pulse rates are not harmonically related and the extension of the circuitry according to the invention is particularly directed toward communication systems in which the different pulse rates are harmonically related as is more frequently the case. It is recognized that the voltage spikes will constructively build up the voltage in the resonant circuit of the circuits tuned to higher harmonic fundamental pulse repetition rates and that the resonant circuits tuned to lower than the current fundamental repetition rate will as often be pulsed destructively as constructively, thereby resulting in a much lower voltage level output. The resulting voltages in adjacent channels are then compared to determine which channel is generating the greatest excess voltage over the next lower frequency neighbor. A single branch circuit will then deliver a voltage at the output of the comparing means sufficiently great for clearly indicating which fundamental repetition rate is currently being received and for controlling the clocking pulse generating circuitry.

In order that the more practical aspects of the invention may readily be realized, a preferred embodiment, given by way of example only, is described hereinafter with reference to the accompanying drawing, forming a part of the specification, in which:

The sole figure is a functional diagram of clocking pulse rate detection circuitry according to the invention.

As hereinbefore mentioned, the invention is located in the receiving station of an adaptive communication system and accomplishes the objects by recognizing the fundamental repetition rate of the pulse modulation on the carrier selected for communication at the transmitting station and by adapting the data processing circuitry at the receiving station to respond to the selected pulse repetition rate, that is, the circuit responds to the presence of data and discriminates against most spurious impulses.

In an adaptive communication system, for example, that adaptive communication system shown and described in the co-pending U.S. patent application Serial Number 325,644 of John R. Featherston, filed on the 26th of November, 1963, and issued on August 23, 1966 as U.S. Patent 3,268,816, there is a demodulator at the output of which there is produced a data signal in the form of a train of data pulses of fundamental repetition rate to one of a plurality of predetermined fundamental pulse repetition rates at which the communications system is capable of operating. This data signal is applied to data processing circuitry for extracting the information represented by the pulse train. Clocking pulse train generating circuitry is provided for the data processor for so processing the information. The output of the demodulator comprising the data signal preferably is also applied in known manner to the clocking pulse generating circuitry to synchronize the operation exactly with the data train of pulses to accommodate small differences in clocking pulse rate between the transmitter and the receiver once the fundamental repetition rate has been determined. In order that the clocking pulse generating circuitry can provide a pulse train of fundamental pulse repetition rate of the transmitted data, the demodulated pulse data signal is applied to clocking pulse rate detection circuitry according to the invention for determining which one of the several different fundamental predetermined pulse repetition rates is present in the data signal and for controlling the clocking pulse generating circuitry to deliver a clocking pulse train of that same fundamental repetition rate.

The sole figure of the drawing constitutes a functional diagram of a pulse rate detector with schematic details sufficient for those skilled in the art to adapt the invention to their own particular purposes.

The data signal of undetermined fundamental pulse repetition rate is applied at the input terminals 22 of a spike pulse generating circuit 24. The generating circuit 24 comprises a capacitor 23 and a resistor 25 of values suitable for performing the differentiating function. A transistor 27 is employed to invert the signal for application to another differentiating circuit comprising a capacitor 23' and a resistor 25'. The outputs of the differentiators are applied to an OR circuit comprising a pair of diodes 28 and 28', and a resistor 29. Positive going transition spikes appearing on the output line 26 corresponding to the rising or falling impulses of the applied pulse signal are fed in common to a plurality of circuit branches 30–(N), of which five are shown by way of example.

Each branch in general comprises an emitter follower circuit 32–(N), a band pass filter including a tuned circuit 34–(N), a full wave rectifier 36–(N) and a low pass filter 38–(N). The output line 39–(N) carries a direct voltage of value proportional to the amplitude of the voltage built up in the tuned circuit 34–(N) and thus bears an indication of the detected pulse repetition rates since if the receiver is translating a signal one output line 39–(N) will be at a potential substantially different than all of the others especially where the permitted rates are not harmonically related. Of course, if no signal is being received substantially equal noise voltages in all branches will so indicate. The functions of the various circuits can be performed by a number of known circuits available to the artisan.

One branch circuit 30–($n-1$) is shown in greater detail in order to insure that there shall be a complete understanding of the invention. The emitter follower circuit 32–($n-1$) is identical to all the others and preferably comprises a level setting potentiometer 40 as shown for adjusting the branch circuits to equalize performance. The branch circuits are isolated from each other by an emitter follower transistor 41. The output of the emitter follower transistor 41 is applied to the input of the band pass filter 34–($n-1$). All of these band pass filter circuits are identical in circuit configuration, but each one is tuned to a different one of the plurality of fundamental repetition rates. The band of frequencies to be passed by each filter is relatively so narrow that simple tuned circuits, such as the inductance-capacitance circuit 42 resonant to the desired pulse repetition frequency, are sufficient for most adaptive communication systems. The bandwidth of each of the several band pass filters should be the same. This is easily accomplished by selecting resonant circuits 42 each with a "figure of merit" or "Q" proportional to the resonant frequency. An alternating voltage proportional to the frequency components of the pulse wave applied is built up in the resonant circuit 42. The major component frequency will be built up in that branch resonant circuit tuned to the frequency of the currently transmitted data signal. The output of the resonant circuit 42 is then submitted to amplitude measurement, as by a high impedance voltmeter. As shown the developed voltage is applied to a paraphase amplifier transistor 46 from which the alternating voltage is applied to a full wave rectifier 36–($n-1$). The rectifier can be any known type of rectifier; the example shown here is a 4-diode full wave bridge rectifying circuit 47. The varying unidirectional current output of the rectifier is integrated by means of a low pass filter 38–($n-1$) shown here as a simple series inductor-shunt capacitor filter, for passing variations in signal occurring over a few seconds times as compared to signal variations of milliseconds or deciseconds. A simple resistor-capacitor filter can often be used as well. The direct voltage at the output line 39–($n-1$) preferably is applied to a transistor 49 of a phase splitting stage 50–($n-1$) which produces the erect voltage on an output line 51–($n-1$) and an inverted voltage on output line 52–($n-1$). While the paraphase amplifying circuit may have one variable resistor in order to balance the output lines, in practice it has been found that small differences in values of output voltages arising from a slight mismatch resistor of normal commercial tolerances is of substantially no importance in the operation of the invention.

Corresponding voltages on the output lines 51–(N) or 52–(N) are directly useful as indicators of the currently transmitted pulse repetition rate and as control voltages for controlling the operation of clocking pulse generator in the associated data processing equipment. This is especially true if the predetermined clocking pulse repetition rates are not harmonically related. In the usual adaptive communication system, however, the plurality of clocking pulse repetition rates are more conveniently in harmonic relationship. For example, one such series of rates is 50, 100, 200, 400, or 800 bauds, and another such series is 75, 150, 300, 600, 1200 and 2400 bauds. Obviously, other series may be used depending upon the situation at hand.

Further according to the invention, a more positive indication is had at the output lines of arithmetic combining or logical ADD circuits 60–(N), which may be of the conventional poly-resistor configuration as shown in detail in the schematic circuit 60–($n-1$). The differentiated voltage spikes will constructively build up the voltage in the resonant circuits tuned to higher repetition rates as well as that turned to the current pulse repetition rate, and the circuits tuned to lower than the current pulse repetition rate will as often be pulsed destructively as constructively, thereby resulting in a much lower voltage level output. Therefore, according to the invention the erect output over line 51–(N) of each branch circuit is applied to the corresponding ADD circuit 60–(N) along with the inverted output (on line 52–($n-1$) as shown) of the next lower pulse repetition rate branch circuit as shown. A noise voltage branch 30–(½) is provided for operation with the lowest repetition rate branch 30–(1) and is preferably tuned to one-half the baud rate of the latter. Random noise, affecting all tuned circuits equally, has much less effect on the detection circuitry according to the invention since subtracting one signal from another eliminates the contribution due to noise. In this manner the inverted voltage is in effect subtracted from the erect voltage providing a still greater difference in voltages between that of the branch circuit carrying the currently transmitted pulse repetition rate and the other branch circuits. For example, typical performance at 400 bauds of a circuit as shown in the figure (where the trigger circuits 70–(N) each had a threshold voltage of +5 volts) is given in the table below:

TYPICAL PERFORMANCE

| Branch $n$-5 | Rate Bauds | Line 39–(N) Volts | Line 66–(N) Volts | Terminals 76–(N) Volts |
|---|---|---|---|---|
| 5 | 800 | 8 | −2.0 | 0 |
| 4 | 400 | 10 | +8.0 | 1 |
| 3 | 200 | 2 | +0.5 | 0 |
| 2 | 100 | 1.5 | 0.0 | 0 |
| 1 | 50 | 1.5 | 0.0 | 0 |
| ½ | Noise | 1.5 | 0.0 | ------------ |

For a better control of the circuitry in the associated clocking pulse generating circuit a trigger circuit 70–(N) is individually connected to each of the ADD circuits 60–(N). Preferably, but not necessarily, the trigger circuit 70–(N) comprises two transistors 71 and 72 connected in a well known emitter-coupled binary reciproconductive circuit more popularly known as the "Schmitt Trigger" circuit. As employed herein, the term "reciproconductive circuit" is construed to include all two-active element regenerative devices in which conduction alternates in one or the other active element in response to applied triggering potential. The circuit 70–($n-1$) shown in the figure is termed an "emitter-coupled binary reciproconductive circuit." Those skilled in the art will readily adapt other reciproconductive circuits and control circuits as they desire.

With the system shown and described, no special coding restriction is placed on the data which remains free to assume any practical sequence of pure form duration bits desired. It is possible that with the detection circuitry shown, misfunction might occur if the received data consists of a very long sequence of 1100110011001100, but with practical codes the probability of this pattern continuing for the period of time required to cause the wrong decision (several seconds) is exceedingly remote.

While the invention has been particularly shown and described with reference to a preferred embodiment thereof, it will be understood by those skilled in the art that the foregoing and other changes in form and detail may be made therein without departing from the spirit and scope of the invention as defined in the appended claims.

The invention claimed is:

1. Circuitry for determining the current pulse repetition rate of a data signal conveyed over an adaptive communications system transmitting said data signal at one of a plurality of different fundamental pulse repetition rates comprising, means for producing a train of unidirectional pulses from said data signal, a plurality of filter circuits having input terminals coupled in common to the output terminal of said pulse producing means and having output terminals, each of said filter circuits being tuned to resonance at a different one of said fundamental pulse repetition rates, a plurality of full wave rectifier circuits each coupled to one of said filter circuits, a plurality of low-pass filter circuits coupled individually to said rectifier circuits, a plurality of inverting circuits having input terminals individually connected to said low-pass filter circuits and each having an output terminal, a plurality of ADD circuits each having two input terminals and an output terminal, one input terminal of each ADD circuit being coupled to a corresponding low-pass filter and the other input terminal of the ADD circuit being coupled to the output terminal of the phase inverting circuit of the next lower repetition rate, whereby a voltage indicative of the current repetition rate is present at the output terminal of one of said ADD circuits and voltages of different value are present at the output terminals of all other ADD circuits, and at least one bistable circuit having an input terminal coupled to the output terminal of an ADD circuit and having an output indicating the current repetition rate.

2. Circuitry for determining the current pulse repetition rate of a data signal conveyed over an adaptive communications system transmitting that data signal at one of a plurality of different fundamental repetition rates comprising, means for producing a train of unidirectional pulses from said data signal, a plurality of circuit branches having input terminals coupled in common to the output terminal of said pulse producing means and having output terminals, each of said circuit branches having a filter circuit tuned to resonance at a different one of said fundamental pulse repetition rates, a full wave rectifier circuit coupled to said filter circuit, a low-pass filter circuit coupled to said rectifier circuit, an inverting circuit having an input terminal connected to said low-pass filter circuit and having an output terminal, and an ADD circuit having two input terminals and an output terminal, one input terminal of each ADD circuit being coupled to the output terminal of said low-pass filter circuit of one channel and the other input terminal of the ADD circuit being coupled to the output terminal of the phase inverting circuit of the next lower repetition rate branch circuit whereby a voltage indicative of the current repetition rate is present at the output terminal of one of said ADD circuits and voltages of different value are present at the output terminals of all other ADD circuits, and at least one bistable circuit having an input terminal coupled to the output terminal of an ADD circuit and providing an output indicating the current repetition rate.

3. Circuitry for determining the current pulse repetition rate of a data signal conveyed by an adaptive communications system transmitting said data signal at one of a plurality of different fundamental pulse repetition rates comprising, means for differentiating said data signal, means for inverting said data signal, means for differentiating the inverted signal, an OR gate having input terminals individually connected to said differentiating means and having an output terminal, a plurality of filter circuits having input terminals coupled in common to the output terminal of said OR gate and having output terminals, each of said filter circuits being tuned to resonance at a different one of said fundamental pulse repetition rates, a plurality of full wave rectifier circuits each coupled to one of said filter circuits, a plurality of low-pass filter circuits individually coupled to said rectifier circuits, a plurality of phase splitting circuits having input terminals individually connected to said low-pass filter circuits and each having two output terminals, a plurality of ADD circuits each having two input terminals and an output terminal, one input terminal of each ADD circuit being coupled to a given output terminal of a corresponding phase inverting circuit and the other input terminal of the ADD circuit being coupled to the output terminal of the phase inverting circuit of the next lower repetition rate of phase opposite to that of said given output terminal, and a plurality of binary reciproconductive circuits having an input terminal coupled to an output terminal of a corresponding ADD circuit and having an output terminal at which a voltage indicative of the current repetition rate is present at one of said reciproconductive circuits and voltages of different value are present at all other output terminals of said reciproconductive circuits.

4. Circuitry for determining the current pulse repetition rate of a data signal conveyed over an adaptive communications system transmitting said data signal at one of a plurality of different fundamental repetition rates comprising, means for differentiating said data signal, means for inverting said data signal, means for differentiating the inverted signal, an OR gate having input terminals individually connected to said differentiating means and having an output terminal, a plurality of circuit branches having input terminals coupled in common to the output terminal of said OR gate and having output terminals, each of said circuit branches having a filter circuit tuned to resonance at a different one of said fundamental pulse repetition rates, a full wave rectifier circuit coupled to said filter circuit, a low-pass filter circuit coupled to said rectifier circuit, a phase splitting circuit having an input terminal connected to said low-pass filter circuit and having two output terminals, and an ADD circuit having two input terminals and an output terminal, one input terminal of each ADD circuit being coupled to a given output terminal of a phase inverting circuit of one channel and the other input terminal of the ADD circuit being coupled to the output terminal of the phase inverting circuit of the next lower repetition rate circuit branch of phase opposite to that of said given output terminal, and a plurality of binary reciproconductive circuits having an input terminal coupled to an output terminal of an ADD circuit and each circuit branch having an output terminal at which a voltage indicative of the current repetition rate is present at one of said reciproconductive circuits and voltages of different value are present at all other output terminals of said reciproconductive circuits.

References Cited

UNITED STATES PATENTS

| | | | |
|---|---|---|---|
| 2,570,431 | 10/1951 | Crosby | 325—304 |
| 2,820,896 | 1/1958 | Russell et al. | 328—153 |
| 3,111,625 | 11/1963 | Crafts | 325—423 |
| 3,213,370 | 10/1965 | Featherston | 325—304 |
| 3,215,934 | 11/1965 | Sallen | 325—304 |
| 3,223,929 | 12/1965 | Hofstad et al. | 328—140 |
| 3,268,816 | 8/1966 | Featherston | 325—302 |

ARTHUR GAUSS, *Primary Examiner.*

H. A. DIXON, *Assistant Examiner.*